(12) United States Patent
Van Eaton et al.

(10) Patent No.: US 12,498,862 B2
(45) Date of Patent: Dec. 16, 2025

(54) PROGRAMMABLE PHYSICAL SECURITY IDENTIFIER

(71) Applicant: Samsung Electronics Co., Ltd., Suwon-si (KR)

(72) Inventors: Thomas Cougar Van Eaton, Caldwell, ID (US); Donhak Kim, Hwaseong-si (KR); Lucky Ananda Hemarga, Austin, TX (US); Pilchang Son, Seattle, WA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

(21) Appl. No.: 18/179,973

(22) Filed: Mar. 7, 2023

(65) Prior Publication Data
US 2024/0192864 A1 Jun. 13, 2024

Related U.S. Application Data (60) Provisional application No. 63/431,201, filed on Dec. 8, 2022.

(51) Int. Cl.
*G06F 3/06* (2006.01)

(52) U.S. Cl.
CPC .......... *G06F 3/0622* (2013.01); *G06F 3/0634* (2013.01); *G06F 3/0673* (2013.01)

(58) Field of Classification Search
CPC ..... G06F 3/0622; G06F 3/0634; G06F 3/0673
See application file for complete search history.

(56) References Cited

U.S. PATENT DOCUMENTS

| | | | |
|---|---|---|---|
| 6,260,120 B1 * | 7/2001 | Blumenau | G06F 21/80 |
| | | | 711/149 |
| 7,591,014 B2 | 9/2009 | England et al. | |
| 8,598,982 B2 | 12/2013 | Bhandari et al. | |
| 9,135,417 B2 | 9/2015 | Wang et al. | |
| 9,626,531 B2 | 4/2017 | Natarajan et al. | |
| 10,101,947 B2 | 10/2018 | Hong et al. | |
| 10,509,735 B2 | 12/2019 | Isozaki et al. | |
| 11,216,597 B2 | 1/2022 | Alon et al. | |

(Continued)

FOREIGN PATENT DOCUMENTS

| | | |
|---|---|---|
| WO | 2004/114122 A2 | 12/2004 |
| WO | 2004/114122 A3 | 12/2004 |

OTHER PUBLICATIONS

EPO Extended European Search Report dated Jan. 19, 2024, issued in European Patent Application No. 23212261.4 (8 pages).

*Primary Examiner* — Baboucarr Faal
(74) *Attorney, Agent, or Firm* — Womble Bond Dickinson (US) LLP (57) ABSTRACT

A system and method using a programmable physical security identifier. In some embodiments, the method includes: receiving, by a persistent storage device including persistent storage, a first identifier programming command, the first identifier programming command being for defining a first physical security identifier; storing, by the persistent storage device, the first physical security identifier; receiving, by the persistent storage device, a revert command, the revert command including an input physical security identifier; and erasing, by the persistent storage device, based on the input physical security identifier matching the first physical security identifier, a portion of the persistent storage.

20 Claims, 2 Drawing Sheets

(56) References Cited

U.S. PATENT DOCUMENTS

| | | |
|---|---|---|
| 11,507,284 B2 | 11/2022 | Isozaki et al. |
| 2009/0050697 A1 | 2/2009 | Sparks et al. |
| 2011/0271119 A1 | 11/2011 | Lin |
| 2017/0054560 A1 | 2/2017 | Lin |
| 2018/0357192 A1* | 12/2018 | Chun ........................ G06F 1/26 |
| 2019/0087113 A1 | 3/2019 | Isozaki et al. |
| 2020/0293206 A1* | 9/2020 | Isozaki ................. G06F 3/0622 |
| 2022/0283704 A1 | 9/2022 | Hieb et al. |

\* cited by examiner

PROGRAMMABLE PHYSICAL SECURITY IDENTIFIER

CROSS-REFERENCE TO RELATED APPLICATION(S)

The present application claims priority to and the benefit of U.S. Provisional Application No. 63/431,201, filed Dec. 8, 2022, entitled "SECONDARY PROGRAMMABLE PSIDS", the entire content of which is incorporated herein by reference.

FIELD

One or more aspects of embodiments according to the present disclosure relate to persistent storage, and more particularly to programmable physical security identifiers.

BACKGROUND

Persistent storage devices may be used for various applications, including in data storage facilities in which large arrays of persistent storage devices may be used to store data. In such a facility, the owner of the persistent storage devices may be a different entity from the user of the persistent storage devices (which may be the owner of the user data stored in the persistent storage devices).

It is with respect to this general technical environment that aspects of the present disclosure are related.

SUMMARY

According to an embodiment of the present disclosure, there is provided a method, including: receiving, by a persistent storage device including persistent storage, a first identifier programming command, the first identifier programming command being for defining a first physical security identifier; storing, by the persistent storage device, the first physical security identifier; receiving, by the persistent storage device, a revert command, the revert command including an input physical security identifier; and erasing, by the persistent storage device, based on the input physical security identifier matching the first physical security identifier, a portion of the persistent storage.

In some embodiments, the first identifier programming command includes a primary physical security identifier.

In some embodiments, the portion is a namespace of the persistent storage device.

In some embodiments, the portion is a partition of the persistent storage device.

In some embodiments, the method further includes: receiving, by the persistent storage device, a read-only command, the read-only command including the first physical security identifier; and transitioning, by the persistent storage device, into a read-only state, in which: write commands are declined, and erase commands lacking a physical security identifier are declined.

In some embodiments, the method further includes: receiving, by the persistent storage device, a lock command, the lock command including the first physical security identifier; and transitioning, by the persistent storage device, into a locked state, in which: read commands are declined, write commands are declined, and erase commands lacking a physical security identifier are declined.

In some embodiments, the method further includes: receiving, by the persistent storage device, a second identifier programming command, including the first physical security identifier, the second identifier programming command being for defining a second physical security identifier; and storing, by the persistent storage device, the second physical security identifier, wherein the first physical security identifier has a first authorization level.

In some embodiments: the first physical security identifier is stored in a first region of the persistent storage; the second physical security identifier is stored in a second region of the persistent storage; and the method further includes: receiving, by the persistent storage device, a third identifier programming command, including the second physical security identifier, the third identifier programming command being for defining a third physical security identifier; and declining, by the persistent storage device, the third identifier programming command, wherein the second physical security identifier has a second authorization level, lower than the first authorization level.

In some embodiments: the first physical security identifier is stored in a first region of the persistent storage; the third physical security identifier is stored in a second region of the persistent storage; and the second region of persistent storage includes permanent persistent storage.

In some embodiments, the method further includes: receiving, by the persistent storage device, a fourth identifier programming command, including the first physical security identifier, the fourth identifier programming command being for modifying an association of the first physical security identifier with a namespace of the persistent storage device; and executing, by the persistent storage device, the third identifier programming command.

According to an embodiment of the present disclosure, there is provided a persistent storage device including: a processing circuit; and persistent storage, operatively connected to the processing circuit, the processing circuit being configured to perform a method, the method including: receiving, by a persistent storage device including persistent storage, a first identifier programming command, the first identifier programming command being for defining a first physical security identifier; storing, by the persistent storage device, the first physical security identifier; receiving, by the persistent storage device, a revert command, the revert command including an input physical security identifier; and erasing, by the persistent storage device, based on the input physical security identifier matching the first physical security identifier, a portion of the persistent storage.

In some embodiments, the first identifier programming command includes a primary physical security identifier.

In some embodiments, the portion is a namespace of the persistent storage device.

In some embodiments, the portion is a partition of the persistent storage device.

In some embodiments, the method further includes: receiving, by the persistent storage device, a read-only command, the read-only command including the first physical security identifier; and transitioning, by the persistent storage device, into a read-only state, in which: write commands are declined, and erase commands lacking a physical security identifier are declined.

In some embodiments, the method further includes: receiving, by the persistent storage device, a lock command, the lock command including the first physical security identifier; and transitioning, by the persistent storage device, into a locked state, in which: read commands are declined, write commands are declined, and erase commands lacking a physical security identifier are declined.

In some embodiments, the method further includes: receiving, by the persistent storage device, a second identifier programming command, including the first physical security identifier, the second identifier programming command being for defining a second physical security identifier; and storing, by the persistent storage device, the second physical security identifier, wherein the first physical security identifier has a first authorization level.

In some embodiments, the method further includes: receiving, by the persistent storage device, a third identifier programming command, including the second physical security identifier, the third identifier programming command being for defining a third physical security identifier; and declining, by the persistent storage device, the third identifier programming command, wherein the second physical security identifier has a second authorization level, lower than the first authorization level.

In some embodiments, the method further includes: receiving, by the persistent storage device, a fourth identifier programming command, including the second physical security identifier, the fourth identifier programming command being for modifying an association of the first physical security identifier with a namespace of the persistent storage device; and declining, by the persistent storage device, the third identifier programming command.

According to an embodiment of the present disclosure, there is provided a persistent storage device including: means for processing; and persistent storage, operatively connected to the means for processing, the means for processing being configured to perform a method, the method including: receiving, by a persistent storage device including persistent storage, a first identifier programming command, the first identifier programming command being for defining a first physical security identifier; storing, by the persistent storage device, the first physical security identifier; receiving, by the persistent storage device, a revert command, the revert command including an input physical security identifier; and erasing, by the persistent storage device, based on the input physical security identifier matching the first physical security identifier, a portion of the persistent storage.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a system and method for programmable physical security identifiers provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

A persistent storage device (e.g., a solid-state drive (SSD)) may be programmed with a physical security identifier (PSID) which may also be printed (e.g., in a hexadecimal representation) on the outside of an enclosure of the persistent storage device. The physical security identifier may be, when represented in binary, a relatively long number (e.g., 128 bits long or longer). In operation, the persistent storage device may be capable of performing secure storage operations in response to commands received by a host. For example, the persistent storage device may receive a secure write command including a set of credentials, from the host, and in response it may store data, received with the secure write command, in persistent storage of the persistent storage device, in a manner that prevents other, subsequent commands from modifying, reading, or deleting the stored data unless such commands also include the credentials, or (as discussed in further detail below) the physical security identifier.

In some circumstances, the owner of the persistent storage device may be a different entity from the user of the persistent storage device. For example, a first entity may construct a data storage facility including a plurality of persistent storage devices, and provide data storage services to users (other entities), by giving the users access to the persistent storage devices. If one of the users ceases to use one of the persistent storage devices, it may be advantageous for the owner of the persistent storage device to restore (or "revert") the persistent storage device, by, e.g., erasing from it any data that was stored on it by the user.

In some embodiments, a physical security identifier may be used for this purpose. For example, a controller of the persistent storage device may be configured, upon receipt of a "revert" command, to revert the persistent storage device, e.g., to delete all stored user data from persistent storage of the persistent storage device, regardless of whether or not the user data was stored using secure write commands. The use of this method may be burdensome, however, especially when a large number of persistent storage devices are to be reverted, as it may involve reading the physical security identifiers from the enclosures of the persistent storage devices, or setting up, at the time of construction, a system for recording the physical security identifier of each persistent storage device. If the persistent storage devices are all manufactured (e.g., custom manufactured, for the owner) with the same, common physical security identifier, then the reverting of a large number of persistent storage devices is more convenient, but such an approach may make the system vulnerable to attack by anyone in possession of the common physical security identifier.

As such, in some embodiments, a persistent storage device is configured to recognize two or more physical security identifiers. One of these physical security identifiers, which may be referred to as the "primary" physical security identifier, may be programmed into the persistent storage device, e.g., at the time of manufacture and may be printed on the outside of the enclosure of the persistent storage device. In other implementations it is not printed on the enclosure. The persistent storage device may also be configured to recognize one or more additional physical security identifiers, which may be referred to as "secondary" physical security identifiers, which may be programmed into the persistent storage device subsequently, and which may (unlike the primary security identifier) be modified or erased. In some embodiments, the programming or erasing of a secondary physical security identifier requires knowledge of a (primary or secondary) physical security identifier.

Each secondary physical security identifier may be, e.g., a relatively long binary number (e.g., 128 bits long or longer).

In such an embodiment, an owner of persistent storage devices, may, during the construction of a data storage facility, program all of the persistent storage devices with the same secondary physical security identifier. The secondary physical security identifier may be kept secret, and used only when one or more of the persistent storage devices in the facility are to be reverted. If the secondary physical security identifier is compromised (e.g., if a person in possession of the secondary physical security identifier ceases to be employed by the owner), then the owner may reprogram all of the persistent storage devices with a new secondary physical security identifier, to maintain the security of the data storage facility.

Figure 1:
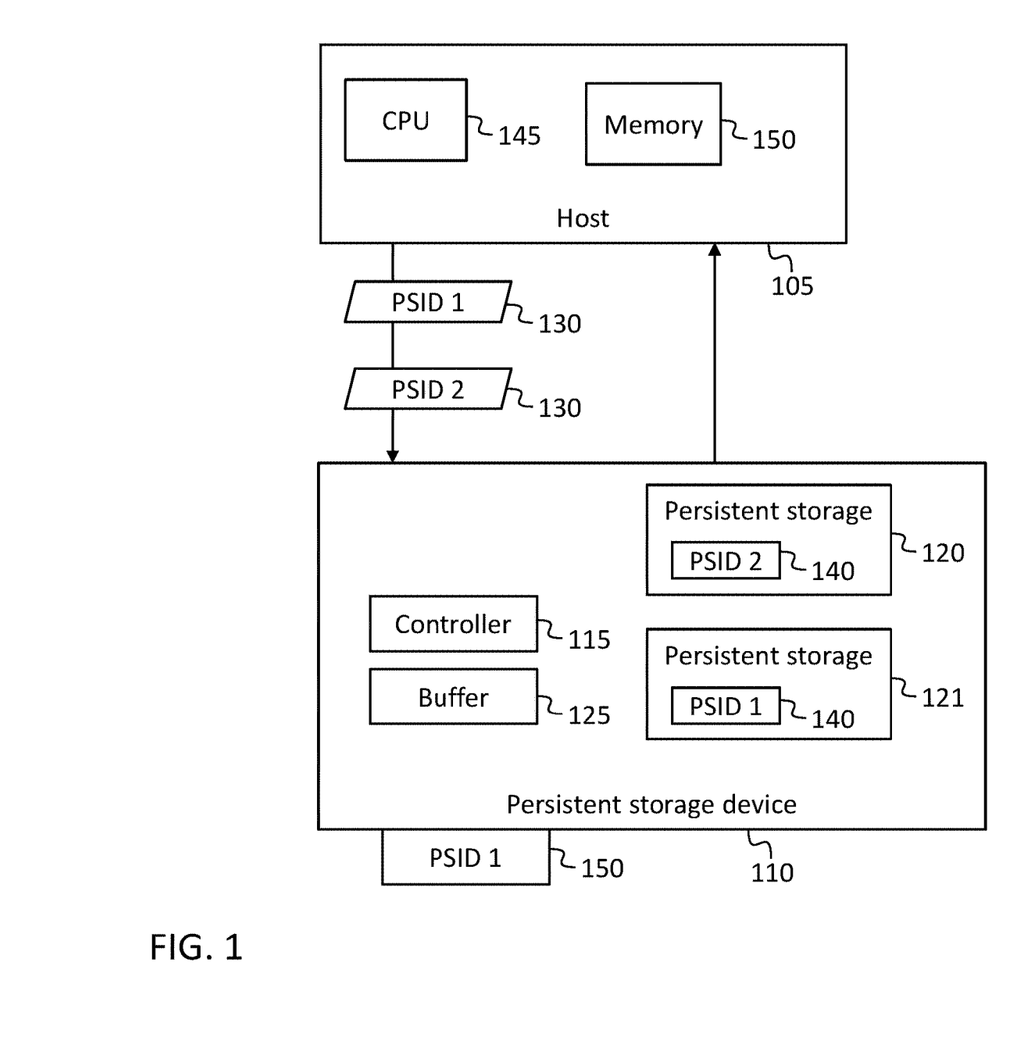
FIG. 1 is a block diagram of a portion of a computing system, according to an embodiment of the present disclosure.

FIG. 1 is a block diagram of a portion of a computing system, in some embodiments. A host 105 includes (or, as shown, is connected to) a persistent storage device 110. The persistent storage device 110 may include a controller 115 (which may be, be part of, or include a processing circuit), persistent storage 120 (which may also be referred to as primary persistent storage), and additional (e.g., secondary) persistent storage 121), and a buffer 125. In some embodiments, the secondary persistent storage 121 is physically separate from the persistent storage 120, and, in some embodiments, the secondary persistent storage 121 is "permanent" (i.e., non-erasable, non-reprogrammable) persistent storage (e.g., it may be or include a diode matrix, a mask read-only memory (ROM) integrated circuit, or a fusible link programmable read-only memory (PROM)). The host may include a central processing unit (CPU) 145 and a host memory 150. In operation, the CPU 145 of the host 105 may read and execute instructions from the host memory 150, and, in accordance with such instructions, the host CPU 145 may on occasion send commands to the persistent storage device 110, e.g., commands instructing the persistent storage device 110 to save data or to retrieve data for the host 105. The controller 115 of the persistent storage device 110 may, in response to such commands, perform write or read operations in the persistent storage 120, using the buffer 125 as needed for temporary storage for such operations. The host 105 may also, on occasion, send a PSID-containing command 130 containing a physical security identifier (e.g., a revert command or a physical security identifier programming command (discussed in further detail below)) to the persistent storage device 110 which may, in response, execute the PSID-containing command 130 only if the physical security identifier that it contains matches a physical security identifier 140 stored in the persistent storage 120 (or in another persistent storage area such as the secondary persistent storage 121). One or more of the physical security identifiers 140 may be printed on a label 150 affixed to the exterior of the persistent storage device 110.

When the persistent storage device 110 is manufactured, any of several configurations may be employed for secondary physical security identifiers. In some embodiments, no secondary physical security identifiers are programmed at the time of manufacture, and any such programming is performed by the owner, after acquiring the persistent storage device 110.

In some embodiments, the primary and secondary physical security identifiers are distinguished in part based on where they are stored (e.g., the primary physical security identifier may be stored in the (primary) persistent storage 120 and the secondary physical security identifiers may be stored in the secondary persistent storage 121, or the secondary physical security identifier may be stored in the (primary) persistent storage 120 and the primary physical security identifiers may be stored in the secondary persistent storage 121). In some embodiments, the primary and secondary physical security identifiers are distinguished in part based on the permissions required for changing them. For example, the primary physical security identifier alone may be capable of changing the primary physical security identifier, and both the primary physical security identifier and a secondary physical security identifier may be capable of changing the secondary physical security identifier. As used herein, when a physical security identifier is described of being "capable" of some action, or being "authorized" to perform some action, it means that if the persistent storage device 110 receives a command to perform the action, and the command includes the physical security identifier, the persistent storage device 110 will perform the action.

In some embodiments, one secondary physical security identifier is programmed, at the time of manufacture, to a fixed, owner-specific (e.g., customer-specific) value, and the owner may then reprogram this secondary physical security identifier (e.g., to a value not known to the manufacturer) before putting the persistent storage device 110 into service. In some embodiments, a secondary physical security identifier is set, at the time of manufacture, to the same value as the primary physical security identifier. In some embodiments, the capabilities of the primary physical security identifier (e.g., the capabilities of a command, sent to the persistent storage device 110, including the primary physical security identifier) are unaffected by the programming of any secondary physical security identifiers, e.g., in all circumstances it remains possible to revert the entire persistent storage device 110 using the primary physical security identifier (e.g., a revert command, including the primary physical security identifier, sent to the persistent storage device 110, will cause the controller 115 of the persistent storage device 110 to revert the persistent storage device 110).

In some embodiments, a secondary physical security identifier may be associated with (or "assigned to") one or more namespaces or partitions of the persistent storage device 110. In such an embodiment, sending the persistent storage device 110 a revert command including the secondary physical security identifier may cause the persistent storage device 110 (e.g., the controller 115 of the persistent storage device 110) to erase only the persistent storage 120 of the namespaces or partitions with which the secondary physical security identifier is associated. In some embodiments, one or more secondary physical security identifiers may have the capability to cause the persistent storage device 110 (e.g., the controller 115 of the persistent storage device 110) to transition to (i) a read-only mode (in which write commands are declined and erase commands lacking (not including) a physical security identifier are declined (not executed) by the persistent storage device 110 (e.g., by the controller 115 of the persistent storage device 110)), or (ii) a locked mode (in which read commands are declined, write commands are declined, and erase commands lacking (not including) a physical security identifier are declined (not executed) by the persistent storage device 110).

Changes in the configuration of the persistent storage device 110 may be made by sending, to the persistent storage device 110 (e.g., by the host) one or more physical security identifier programming commands (which may be examples of identifier programming commands). Such a command may be, e.g., a physical security identifier programming command for defining (e.g., creating) a secondary physical security identifier, or for modifying an association of a secondary physical security identifier with a namespace or partition of the persistent storage device. Such a command may also be a read-only command (for causing the persistent storage device 110 (e.g., the controller 115 of the persistent storage device 110) to transition to read-only mode) or a lock command (for causing the persistent storage device 110 (e.g., the controller 115 of the persistent storage device 110) to transition to locked mode).

Each of the primary physical security identifier and any secondary physical security identifiers may have any of several different authorization levels, which may determine the capabilities each physical security identifier has. As used herein, a physical security identifier may be said to have the capability to perform an action if a command (e.g., a revert command, a read-only command, a lock command, or a physical security identifier programming command) for performing the action, including the physical security identifier, will be executed (i.e., will not be declined) by the persistent storage device 110 (e.g., by the controller 115 of the persistent storage device 110). The authorization levels may be numbered in order of decreasing authorization, with, e.g., Level 0 being the highest authorization level, Level 1 being lower than Level 0, and Level 2 being lower than Level 1. The authorization levels of the secondary physical security identifiers may be individually assigned and may be capable of being set and reset independently. The mapping between physical security identifiers and the corresponding authorization level may be stored, e.g., in a data structure (e.g., a table in the persistent storage 120).

For example, an authorization level that may be referred to as Level 0 may be the authorization level of the primary physical security identifier. This authorization may allow the creation of secondary physical security identifiers, and the assigning of such secondary physical security identifiers to one or more namespaces or partitions. Any physical security identifier having an authorization level of Level 0 may be capable of programming or reprogramming any of the secondary physical security identifier values, their authorization levels, and their assigned namespaces or partitions. In some embodiments, only the primary physical security identifier has Level 0 authorization, and this authorization level cannot be assigned to any secondary physical security identifier. In some embodiments, the primary physical security identifier may, by default, lack the capability to cause the persistent storage device 110 (e.g., the controller 115 of the persistent storage device 110) to transition to a read-only mode or to a locked mode, but it may be capable of changing its own permissions so that it has the capability to cause the persistent storage device 110 (e.g., the controller 115 of the persistent storage device 110) to transition to a read-only mode or to a locked mode.

An authorization level that may be referred to as Level 1 may allow the creation of additional secondary physical security identifiers. Such secondary physical security identifiers may be capable of being assigned to specific namespaces. Such a secondary physical security identifier may, as mentioned above, impact (when used in a revert command) only the one or more namespaces or partitions to which it is assigned. Level 1 authorization may also be used to program or reprogram any of the secondary physical security identifiers, to change their assigned namespaces or partitions and their authorization levels (but not to change any authorization level to Level 0), and to enable and disable additional functions such as transitions to locked or read-only mode. Level 1 authorization may be incapable of making changes to a Level 0 physical security identifier (e.g., to the primary physical security identifier).

A physical security identifier with an authorization level that may be referred to as Level 2 may be authorized to (i) perform a revert of the persistent storage device 110 or of one or more namespaces or partitions with which it is associated, (ii) cause the persistent storage device 110 to transition to read-only mode, or (iii) cause the persistent storage device 110 to transition to locked mode. A secondary physical security identifier with Level 2 authorization may also be capable of reprogramming (only) its own secondary physical security identifier value, of reducing its own authorization level to a lower authorization level, and of causing the persistent storage device 110 (e.g., the controller 115 of the persistent storage device 110) to transition out of read only mode or locked mode. A secondary physical security identifier with Level 2 authorization may not be capable of (i) adding functions, reprogramming any other secondary physical security identifier, or changing the namespaces or partitions with which it is associated, if it is associated with any namespaces or partitions.

An authorization level that may be referred to as Level 3 may be authorized to (i) perform a revert of the persistent storage device 110 or of one or more namespaces or partitions with which it is associated, (ii) cause the persistent storage device 110 (e.g., the controller 115 of the persistent storage device 110) to transition to read-only mode, or (iii) cause the persistent storage device 110 (e.g., the controller 115 of the persistent storage device 110) to transition to locked mode. A secondary physical security identifier with Level 3 authorization may also be capable of reprogramming (only) its own secondary physical security identifier value. It may not be capable of making any other changes in the persistent storage device 110.

An authorization level that may be referred to as Level 4 may be authorized to (i) perform a revert of the persistent storage device 110 or of one or more namespaces or partitions with which it is associated, (ii) cause the persistent storage device 110 (e.g., the controller 115 of the persistent storage device 110) to transition to read-only mode, or (iii) cause the persistent storage device 110 (e.g., the controller 115 of the persistent storage device 110) to transition to locked mode. It may not be capable of making any other changes in the persistent storage device 110.

In some embodiments, each authorization level may be authorized to make changes to physical security identifiers at the authorization level and at lower authorization levels, but not to physical security identifiers at higher authorization levels. In such an embodiment, for example, physical security identifier of Level 1 may be authorized to change physical security identifiers of Level 1 and lower, etc.

In some embodiments, an application running on a host may display to a user a graphical user interface, using which the user may query and modify the secondary physical security identifiers stored in a persistent storage device 110 connected to the host (e.g., connected directly to the host, or connected to another host that is connected, e.g., by a network, to the host). The graphical user interface may also make it possible to modify properties of a secondary physical security identifier (e.g., the namespaces or partitions associated with the secondary physical security identifier or the authorization level of the secondary physical security identifier).

Figure 2:
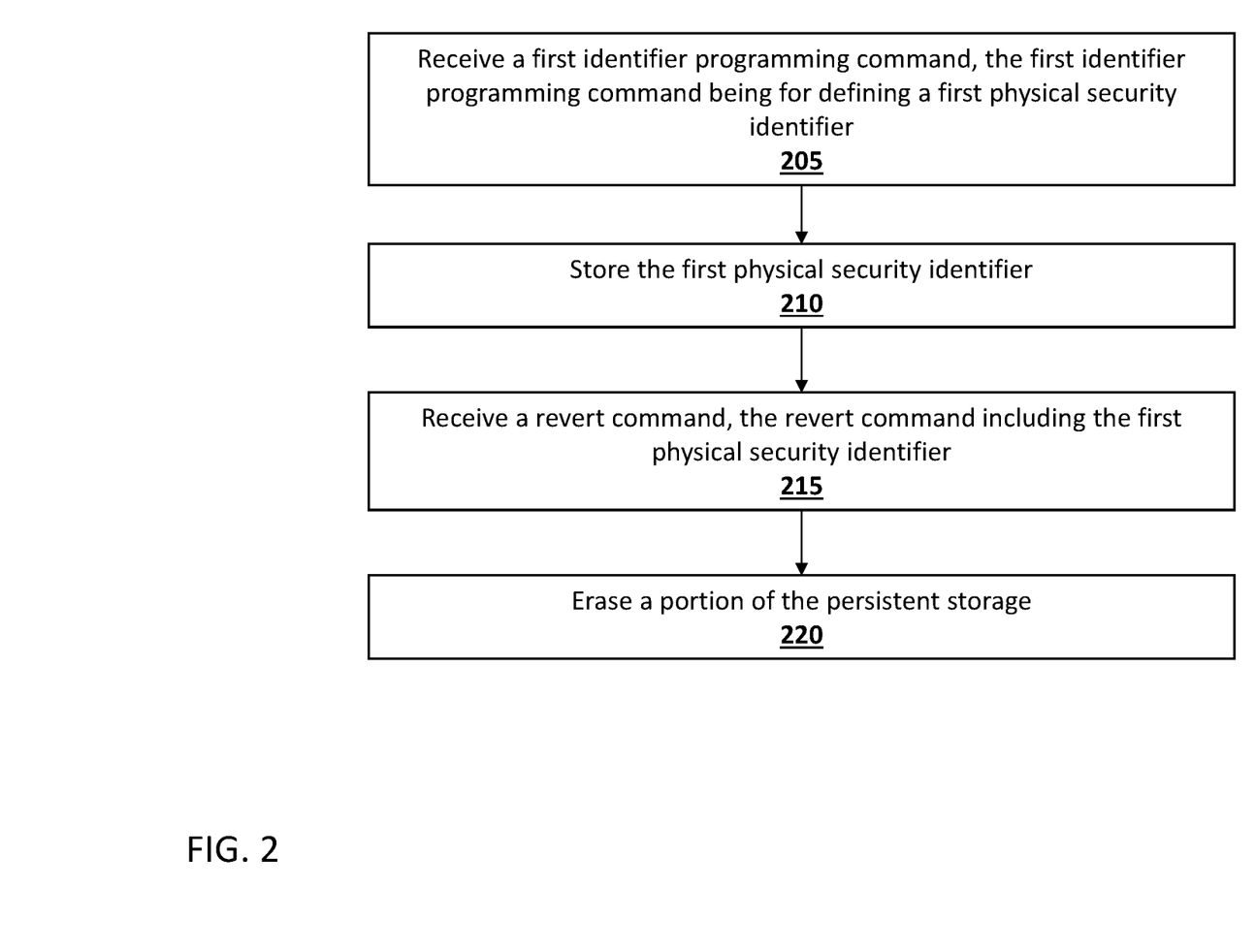
FIG. 2 is a flow chart of a method, according to an embodiment of the present disclosure.

FIG. 2 is a flow chart of a method, in some embodiments. The method includes receiving, at 205, by a persistent storage device 110 (e.g., by the controller 115 of the persistent storage device 110) comprising persistent storage, a first identifier programming command, the first identifier programming command being for defining a first physical security identifier; storing, at 210, by the persistent storage device 110 (e.g., by the controller 115 of the persistent storage device 110), the first physical security identifier; receiving, at 215, by the persistent storage device 110 (e.g., by the controller 115 of the persistent storage device 110), a revert command, the revert command including an input physical security identifier; and erasing, at 220, by the persistent storage device 110 (e.g., by the controller 115 of the persistent storage device 110), a portion of the persistent storage.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the term "or" should be interpreted as "and/or", such that, for example, "A or B" means any one of "A" or "B" or "A and B".

The background provided in the Background section of the present disclosure section is included only to set context, and the content of this section is not admitted to be prior art. Any of the components or any combination of the components described (e.g., in any system diagrams included herein) may be used to perform one or more of the operations of any flow chart included herein. Further, (i) the operations are example operations, and may involve various additional steps not explicitly covered, and (ii) the temporal order of the operations may be varied.

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Some embodiments may include features of the following numbered statements.

1. A method, comprising:
    receiving, by a persistent storage device comprising persistent storage, a first identifier programming command, the first identifier programming command being for defining a first physical security identifier;
    storing, by the persistent storage device, the first physical security identifier;
    receiving, by the persistent storage device, a revert command, the revert command including an input physical security identifier; and
    erasing, by the persistent storage device, based on the input physical security identifier matching the first physical security identifier, a portion of the persistent storage.

2. The method of statement 1, wherein the first identifier programming command comprises a primary physical security identifier.

3. The method of statement 1 or statement 2, wherein the portion is a namespace of the persistent storage device.

4. The method of statement 1 or statement 2, wherein the portion is a partition of the persistent storage device.

5. The method of any one of the preceding statements, further comprising:
    receiving, by the persistent storage device, a read-only command, the read-only command including the first physical security identifier; and transitioning, by the persistent storage device, into a read-only state, in which:
   write commands are declined, and
   erase commands lacking a physical security identifier are declined.

6. The method of any one of the preceding statements, further comprising:
   receiving, by the persistent storage device, a lock command, the lock command including the first physical security identifier; and
   transitioning, by the persistent storage device, into a locked state, in which:
     read commands are declined,
     write commands are declined, and
     erase commands lacking a physical security identifier are declined.

7. The method of any one of the preceding statements, further comprising:
   receiving, by the persistent storage device, a second identifier programming command, comprising the first physical security identifier, the second identifier programming command being for defining a second physical security identifier; and
   storing, by the persistent storage device, the second physical security identifier,
   wherein the first physical security identifier has a first authorization level.

8. The method of any one of the preceding statements, wherein:
   the first physical security identifier is stored in a first region of the persistent storage;
   the second physical security identifier is stored in a second region of the persistent storage; and
   the method further comprises:
     receiving, by the persistent storage device, a third identifier programming command, comprising the second physical security identifier, the third identifier programming command being for defining a third physical security identifier; and
     declining, by the persistent storage device, the third identifier programming command,
     wherein the second physical security identifier has a second authorization level, lower than the first authorization level.

9. The method of statement 8, wherein:
the first physical security identifier is stored in a first region of the persistent storage;
the third physical security identifier is stored in a second region of the persistent storage; and
the second region of persistent storage comprises permanent persistent storage.

10. The method of any one of the preceding statements, further comprising:
   receiving, by the persistent storage device, a fourth identifier programming command, comprising the first physical security identifier, the fourth identifier programming command being for modifying an association of the first physical security identifier with a namespace of the persistent storage device; and
   executing, by the persistent storage device, the third identifier programming command.

11. A persistent storage device comprising:
a processing circuit; and
persistent storage, operatively connected to the processing circuit,
the processing circuit being configured to perform a method, the method comprising:
   receiving, by a persistent storage device comprising persistent storage, a first identifier programming command, the first identifier programming command being for defining a first physical security identifier;
   storing, by the persistent storage device, the first physical security identifier;
   receiving, by the persistent storage device, a revert command, the revert command including an input physical security identifier; and
   erasing, by the persistent storage device, based on the input physical security identifier matching the first physical security identifier, a portion of the persistent storage.

12. The persistent storage device of statement 11, wherein the first identifier programming command comprises a primary physical security identifier.

13. The persistent storage device of statement 11 or statement 12, wherein the portion is a namespace of the persistent storage device.

14. The persistent storage device of any one of statements 11 to 13, wherein the portion is a partition of the persistent storage device.

15. The persistent storage device of any one of statements 11 to 14, wherein the method further comprises:
   receiving, by the persistent storage device, a read-only command, the read-only command including the first physical security identifier; and
   transitioning, by the persistent storage device, into a read-only state, in which:
     write commands are declined, and
     erase commands lacking a physical security identifier are declined.

16. The persistent storage device of any one of statements 11 to 15, wherein the method further comprises:
   receiving, by the persistent storage device, a lock command, the lock command including the first physical security identifier; and
   transitioning, by the persistent storage device, into a locked state, in which:
     read commands are declined,
     write commands are declined, and
     erase commands lacking a physical security identifier are declined.

17. The persistent storage device of any one of statements 11 to 16, wherein the method further comprises:
   receiving, by the persistent storage device, a second identifier programming command, comprising the first physical security identifier, the second identifier programming command being for defining a second physical security identifier; and
   storing, by the persistent storage device, the second physical security identifier,
   wherein the first physical security identifier has a first authorization level.

18. The persistent storage device of any one of statements 11 to 17, wherein the method further comprises:
   receiving, by the persistent storage device, a third identifier programming command, comprising the second physical security identifier, the third identifier programming command being for defining a third physical security identifier; and
   declining, by the persistent storage device, the third identifier programming command,
   wherein the second physical security identifier has a second authorization level, lower than the first authorization level.

19. The persistent storage device of statement 18, wherein the method further comprises:
- receiving, by the persistent storage device, a fourth identifier programming command, comprising the second physical security identifier, the fourth identifier programming command being for modifying an association of the first physical security identifier with a namespace of the persistent storage device; and
- declining, by the persistent storage device, the third identifier programming command.

20. A persistent storage device comprising:
means for processing; and
persistent storage, operatively connected to the means for processing,
the means for processing being configured to perform a method, the method comprising:
- receiving, by a persistent storage device comprising persistent storage, a first identifier programming command, the first identifier programming command being for defining a first physical security identifier;
- storing, by the persistent storage device, the first physical security identifier;
- receiving, by the persistent storage device, a revert command, the revert command including an input physical security identifier; and
- erasing, by the persistent storage device, based on the input physical security identifier matching the first physical security identifier, a portion of the persistent storage.

Although exemplary embodiments of a system and method for programmable physical security identifiers have been specifically described and illustrated herein, many modifications and variations will be apparent to those skilled in the art. Accordingly, it is to be understood that a system and method for programmable physical security identifiers constructed according to principles of this disclosure may be embodied other than as specifically described herein. The invention is also defined in the following claims, and equivalents thereof.

What is claimed is:

1. A method, comprising:
   storing, by a persistent storage device comprising persistent storage, a physical security identifier;
   receiving, by the persistent storage device, a first identifier programming command for storing a first programmable security identifier, the first identifier programming command including the physical security identifier;
   storing, by the persistent storage device in response receiving to the first identifier programming command, the first programmable security identifier, in addition to the physical security identifier, based on the first identifier programming command including the physical security identifier;
   receiving, by the persistent storage device, a revert command, the revert command including an input security identifier; and
   erasing, by the persistent storage device, based on the input security identifier matching the first programmable security identifier, a portion of the persistent storage.

2. The method of claim 1, wherein the physical security identifier comprises a primary physical security identifier.

3. The method of claim 1, wherein the portion is a namespace of the persistent storage device.

4. The method of claim 1, wherein the portion is a partition of the persistent storage device.

5. The method of claim 1, further comprising:
   receiving, by the persistent storage device, a read-only command, the read-only command including the first programmable security identifier; and
   transitioning, by the persistent storage device, into a read-only state, in which:
   write commands are declined, and
   erase commands lacking a security identifier are declined.

6. The method of claim 1, further comprising:
   receiving, by the persistent storage device, a lock command, the lock command including the first programmable security identifier; and
   transitioning, by the persistent storage device, into a locked state, in which:
   read commands are declined,
   write commands are declined, and
   erase commands lacking a security identifier are declined.

7. The method of claim 1, further comprising:
   receiving, by the persistent storage device, a second identifier programming command, comprising the first programmable security identifier, the second identifier programming command being for defining a second programmable security identifier; and
   storing, by the persistent storage device, the second programmable security identifier,
   wherein the first programmable security identifier has a first authorization level.

8. The method of claim 7, wherein:
   the first programmable security identifier is stored in a first region of the persistent storage;
   the second programmable security identifier is stored in a second region of the persistent storage; and
   the method further comprises:
   receiving, by the persistent storage device, a third identifier programming command, comprising the second programmable security identifier, the third identifier programming command being for defining a third programmable security identifier; and
   declining, by the persistent storage device, the third identifier programming command,
   wherein the second programmable security identifier has a second authorization level, lower than the first authorization level.

9. The method of claim 8, wherein:
   the first programmable security identifier is stored in a first region of the persistent storage;
   the third programmable security identifier is stored in a second region of the persistent storage; and
   the second region of persistent storage comprises permanent persistent storage.

10. The method of claim 8, further comprising:
    receiving, by the persistent storage device, a fourth identifier programming command, comprising the first programmable security identifier, the fourth identifier programming command being for modifying an association of the first programmable security identifier with a namespace of the persistent storage device; and
    executing, by the persistent storage device, the third identifier programming command.

11. A persistent storage device comprising:
a processing circuit; and
persistent storage, operatively connected to the processing circuit,
the processing circuit being configured to perform a method, the method comprising:

storing, by the persistent storage device, a physical security identifier;

receiving, by the persistent storage device, a first identifier programming command for storing a first programmable security identifier, the first identifier programming command including the physical security identifier;

storing, by the persistent storage device in response to receiving the first identifier programming command, the first programmable security identifier, in addition to the physical security identifier, based on the first identifier programming command including the physical security identifier;

receiving, by the persistent storage device, a revert command, the revert command including an input security identifier; and erasing, by the persistent storage device, based on the input security identifier matching the first programmable security identifier, a portion of the persistent storage.

12. The persistent storage device of claim 11, wherein the physical security identifier comprises a primary physical security identifier.

13. The persistent storage device of claim 11, wherein the portion is a namespace of the persistent storage device.

14. The persistent storage device of claim 11, wherein the portion is a partition of the persistent storage device.

15. The persistent storage device of claim 11, wherein the method further comprises:

receiving, by the persistent storage device, a read-only command, the read-only command including the first programmable security identifier; and transitioning, by the persistent storage device, into a read-only state, in which:
write commands are declined, and
erase commands lacking a security identifier are declined.

16. The persistent storage device of claim 11, wherein the method further comprises:

receiving, by the persistent storage device, a lock command, the lock command including the first programmable security identifier; and transitioning, by the persistent storage device, into a locked state, in which:
read commands are declined,
write commands are declined, and
erase commands lacking a security identifier are declined.

17. The persistent storage device of claim 11, wherein the method further comprises:

receiving, by the persistent storage device, a second identifier programming command, comprising the first programmable security identifier, the second identifier programming command being for defining a second programmable security identifier; and storing, by the persistent storage device, the second programmable security identifier, wherein the first programmable security identifier has a first authorization level.

18. The persistent storage device of claim 17, wherein the method further comprises:

receiving, by the persistent storage device, a third identifier programming command, comprising the second programmable security identifier, the third identifier programming command being for defining a third programmable security identifier; and declining, by the persistent storage device, the third identifier programming command, wherein the second programmable security identifier has a second authorization level, lower than the first authorization level.

19. The persistent storage device of claim 18, wherein the method further comprises:

receiving, by the persistent storage device, a fourth identifier programming command, comprising the second programmable security identifier, the fourth identifier programming command being for modifying an association of the first programmable security identifier with a namespace of the persistent storage device; and declining, by the persistent storage device, the third identifier programming command.

20. A persistent storage device comprising:

means for processing; and persistent storage, operatively connected to the means for processing, the means for processing being configured to perform a method, the method comprising:

storing, by the persistent storage device, a physical security identifier;

receiving, by the persistent storage device, a first identifier programming command for storing a first programmable security identifier, wherein the first identifier programming command includes the physical security identifier;

storing, by the persistent storage device in response to receiving the first identifier programming command, the first programmable security identifier, in addition to the physical security identifier, based on the first identifier programming command including the physical security identifier;

receiving, by the persistent storage device, a revert command, the revert command including an input security identifier; and erasing, by the persistent storage device, based on the input security identifier matching the first programmable security identifier, a portion of the persistent storage.

* * * * *